Patented Feb. 27, 1951

2,543,741

UNITED STATES PATENT OFFICE 2,543,741

LUBRICATING AND SEALING COMPOSITION OF FLAKE COPPER, POWDERED LEAD, GRAPHITE, AND PETROLEUM VEHICLE

Henry C. Zweifel, Inglewood, Calif., assignor to Richfield Oil Corporation, Los Angeles, Calif., a corporation of Delaware No Drawing. Application December 2, 1948, Serial No. 63,195

3 Claims. (Cl. 252—26)

My present invention relates to the lubricating and sealing of threaded joints, pipe joints for instance, and provides an improved method whereby such joints may be effectively sealed against leakage, yet pressure-welding or galling of the threads prevented. The invention also provides an improved thread lubricating and sealing compound conveniently and effectively used for this purpose.

The invention is especially applicable to threaded members such as used on casing, tubing, tool joints, drill pipe and line pipe commonly used in conjunction with wells, for instance those from which petroleum is produced, as well as other industrial installations requiring threaded pipe or other conduits for the movement of fluids under various conditions of temperature and pressure.

Pipe thread lubricating and sealing compounds varying widely in nature and composition have previously been proposed. They have usually consisted of one or more solid constituents such as clay, talc, graphite, powdered zinc, powdered lead, litharge and protein or cellulose solids suspended in some paste-like carrier such as water-insoluble greases prepared from calcium or aluminum base soaps or other viscous fluid. Although it appears that soft malleable materials should suffice, they are unsatisfactory with respect to preventing leaks and lubrication. Moreover, most of these materials pack excessively or "work-harden" so that they are difficult to remove. I have found, however, that finely divided copper in flake form has significantly superior qualities as a pipe thread lubricant. In addition, I have found that a combination of copper, powdered lead and amorphous graphite has unusual properties and value as a lubricating and sealing compound because it protectively lubricates, thereby preventing galling and chafing, while also stopping leakage. I have further found that such a metallic lubricating medium functions efficiently without the presence of an organic oiliness medium under conditions encountered in threaded members.

This application is filed as a continuation in part of my application Serial No. 738,744, filed April 1, 1947, now abandoned, in order to amplify the description of my new copper-containing and copper-lead-graphite lubricants, defined therein, in terms of the dimensions of the copper flakes.

Pipe threads are of various types and design depending upon the service in which the threaded stock is to be used. Specification tolerances for the control of lead, taper and pitch of the various types of threads for both male and female members have been established and are of obvious importance in reducing leakage. These tolerances, for practical production operations, are such that clearances between mated threads are sufficiently large to allow seepage of fluids under pressure. It frequently occurs that these clearances are not satisfactorily sealed by conventional thread lubricating and sealing compounds. Also, the taper tolerances of two threaded members may be such that the torque required for a tight mating will be largely confined to "point contact," resulting in the lubricant being forced from the area and allowing metal-to-metal contact under high rubbing pressures. This type of lubricant failure frequently results in pressure-welding or galling of the threads. And under the influence of temperature conditions encountered in oil wells, for instance, and other industrial applications, it frequently happens that the lubricant is adversely affected, resulting in abnormally high breaking torques being required to separate the threaded connections or the threads may be "frozen" so that the application of torques high enough to break the connection will result in damage to the collar or tube stock. For example, in the production of oil and gas, deep drilling practices accentuate problems resulting from high pressures, heavier casing swing loads and higher formation temperatures.

I have discovered that threaded joints may be effectively lubricated by applying to the threaded members before mating a composition containing finely divided copper or a finely divided malleable copper alloy. The copper or copper alloy should be in the form of fine flakes or scales and, with particular advantage, is constituted of particles ranging in size from approximately one micron to at least ½ times larger, in their largest dimension, than the maximum combined tolerances of both the mating male and female threads, that is, about 76 microns.

For convenient reference, the term copper will be used herein, and in the appended claims, to designate either copper or a malleable copper alloy or a mixture of copper and such copper alloy.

Thus I have found that malleable metallic powders or dusts exhibiting physical forms such as spheres, irregular shapes and heterogeneous forms, as produced in commercial processes, do not provide continuous protective films. The usual forms of metallic powder have been observed to produce either spotty points of protective material or to have been pushed or rolled entirely out of the pressure area leaving the thread or bearing surfaces entirely unprotected and subject to seizure or galling. Spots or films of these metallic particles are work hardened and adhere to the thread surfaces. These spots or deposits, resulting from the use of powdered metals in conventional form, especially zinc, lead or copper, are extremely difficult to remove. If the removal of such deposits is not complete, they serve as a base on which metallic buildup becomes very rapid on remaking the joint. This excessive buildup is a cause of frozen joints, improper make-up of tubing and casing, and prevents tool joint threads from making up to a point permitting the shoulders or lands to face.

By contrast, I have determined that copper in the form of very fine flakes or scales will produce, under pressure, an overlapping protective film on the bearing surfaces. The copper flakes, in producing the protective film, form cleavage planes at the points of contact between the flakes, thereby substantially assisting in reducing the break away torque required when ordinary metallic powders are employed. These copper flakes also penetrate and fill chafed or scarred areas on the bearing surface as a protection against further damage, and under sufficient pressure, impregnate the bearing surfaces regardless of the surface hardness of the bearing areas.

The dimensions of suitable copper flakes are very small, and ordinarily will be of substantially uniform thickness within the range of $3.9 \times 10^{-5}$ to $19.5 \times 10^{-5}$ inch. Usually, the flake should not exceed, in its greatest dimension, about 76 microns, or ½ times the maximum combined tolerances of both the mating male and female threads as specified by the American Petroleum Institute for threads on oil country tubular stock. Copper in desirable flake form is available commercially, and is produced by several methods of manufacture, one of which, for example, is described in U. S. Patent No. 2,002,891.

The finely divided copper flake of my present invention is used in admixture with or suspension in a carrier, preferably a viscous or semisolid paste-like carrier having lubricating or rust-preventing characteristics, advantageously both. Carriers found particularly suitable are those prepared from a petroleum stock and advantageously compounded with a rust-preventing lead soap, or other soap, for thickening or imparting suitable body to the petroleum stock. The petroleum stock of such carriers usually will comprise from about 30% to about 85% of the sealing and lubricating compound. In lieu of the petroleum stock, or in conjunction therewith, I may use an animal or vegetable oil, or both, suitably bodied or thickened by conventional means. Also I may use a viscous solution of a thermoplastic material, for instance, pyroxylin either alone or in conjunction with other carrier constituents, such as those previously noted. However, the metallic components may be employed with a non-viscous vehicle, like kerosene, thereby insuring an even distribution of such constituents prior to evaporation of the base. Furthermore, the metal components may be agitated in a container with kerosene, or other similar non-viscous vehicles, and applied with a "gun" to the threaded members.

I have determined, however, that these media do not function as thread lubricants, and accordingly, serve simply as convenient mixing and distributing aids for the solid ingredients, for it is obvious that conventional lubricants cannot prevent metal-to-metal contact between the pressure-bearing surface of the mated members when sliding pressures approaching the magnitude of 100,000 pounds per square inch are encountered. Indeed, I have found that a joint may be made up using a non-viscous fluid such as benzol as the wetting agent for the solid constituents. After application of the paste, the benzol is permitted to evaporate leaving a coating of dry solids on the thread surfaces. The joint makes up and breaks out at normal torques and does not develop thread leaks when pressure tested. The residual lubricating film on the thread surfaces, after breaking out the joint, is smooth and oily in appearance, and no indication of chafing or galling is detectable.

Although compositions essentially comprising finely flaked copper may be used without the addition of other solid constituents where the primary concern is that of lubrication, the dimensions of the copper flakes are too small to function effectively as a damming or sealing agent. This sealing of threaded joints against fluid leakage within a normal range of temperature may be successfully accomplished by many commercially available compounds. However, metallic powders, such as lead, zinc, aluminum, tin, etc., when used as such a damming material, exhibit in each instance some definitely undesirable characteristics.

Powdered lead produces a substantially continuous, and apparently fused, thread of soft malleable metal formed by the compression of the lead powder between the thread roots and crests of the mating members. This metallic thread is an effective seal but extremely difficult to remove from the thread roots. The complete removal of this compressed metallic deposit is necessary in the case of any threaded joint to be remade, to assure the complete make-up and prevent "freezing" or "locking" of the joint as a result of overpacking the threads.

Amorphous graphite also forms an impervious dam or plug in the channel between the mated thread roots and crests. However, the crushing strength of graphite is sufficiently low to result frequently in the destruction of the seal by the jarring and vibration imposed upon threaded members during normal handling procedures.

However, I have found that specific combinations of powdered lead and amorphous graphite produce a deposit or dam of completely desirable characteristics. The combined powdered lead and amorphous graphite surprisingly enough produce a seal that is effective at temperatures ranging from $-87°$ F. to $+450°$ F. and under pressures up to 6000 p. s. i. The physical characteristics of the deposit facilitate easy removal by conventional means normally used in thread cleaning operations. Microscopic examination of the deposit reveals that the deposit is composed of substantially individual particles of lead held within a matrix of graphite. The graphite apparently prevents the fusing of the lead particles under the conditions of pressure and temperature encountered, while the lead seemingly possesses the required stability to prevent destruction of the dam under shock or vibration. The graphite is easily removed by normal cleaning procedures so that the lead particles are easily washed from the thread roots.

The ratio of the proportion of amorphous graphite used to that of powdered lead is subject to considerable variation, depending primarily upon the particular use for which the compound is intended. I utilize the lead and graphite in any ratio within the range of one part by weight of lead powder to three parts of amorphous graphite, and three parts by weight of lead powder to one part graphite. However, substantially equal proportions of these two constituents have been used with particular advantage. The ratio of finely divided copper to the combined proportions of the flaked copper, amorphous graphite and lead is also subject to considerable variation and may range from not less than 5% to as high as 100%, by weight, depending primarily upon the intended use.

The ratio of the combined solids to the carrier and other constituents may likewise be varied somewhat depending upon the desired body or stiffness of the resultant compound. About at least 5% of each metallic constituent, or of the copper flake alone, will produce a satisfactory sealing lubricant. However, a sealing and lubricating composition which is characterized by particularly satisfactory performance and economy of manufacture was compounded from the following ingredients in the indicated proportions by weight:

| | Per cent |
|---|---|
| Flake copper | 10.0 |
| Amorphous graphite | 10.0 |
| Powdered lead | 10.0 |
| Viscous petroleum vehicle | 65.51 |
| Aluminum stearate soap | 4.46 |
| Thio-dilauric acid | 0.03 |

The viscous petroleum vehicle is a naphthenic lubricating oil having a Saybolt Universal standard viscosity of 300 to 325 seconds at 100° F., while the thio-dilauric acid functions as a rust inhibitor of relatively low viscosity.

Another compound contemplated by my present invention which I have found to be highly effective was compounded from the following ingredients in the indicated proportions by weight:

| | Per cent |
|---|---|
| Flake copper | 22.0 |
| Amorphous graphite | 22.0 |
| Powdered lead | 22.0 |
| Viscous petroleum vehicle | 31.5 |
| Rust preventive lead soap | 1.5 |
| Other metallic soap | 1.0 |

In the foregoing examples the particle size of the amorphous graphite, powdered lead, and flake copper were within the ranges previously indicated. The viscous petroleum vehicle employed contained 93.63% of a relatively viscous naphthenic petroleum lubricating oil having a Saybolt Universal standard viscosity of 300 to 325 seconds at 100° F. and 6.37% of an aluminum stearate soap stock.

A thread sealing and lubricating compound exhibiting favorable brushability at low temperatures and relatively good consistency at elevated temperatures should employ a suitable base material possessing these properties. A vehicle exhibiting such brushability and suspension characteristics, for example, is one prepared from a light mineral oil of about a 100 second Saybolt Universal standard viscosity at 100° F. and containing a small amount of aluminum stearate. The following composition is illustrative of a thread and sealing lubricant exhibiting these properties:

| | Per cent |
|---|---|
| Flake copper | 16.00 |
| Amorphous graphite | 16.00 |
| Powdered lead | 16.00 |
| Non-viscous petroleum stock | 41.59 |
| Thio-dilauric acid | 0.03 |

This compound was not only brushable at −30° F., but showed no separation when maintained at +130° F. for a period of seven days. Storage under static conditions for five months in a temperature range of 60° F. to 100° F. showed no indication of separation and centrifugation at an ambient temperature of approximately 120° F. for an eight-hour period under a relative centrifugal force of 453 showed only a trace of oil separation and no solid separation.

In these compounds the primary function of the amorphous graphite and the powdered lead is to form a dam between the thread clearances, thereby preventing the flow of fluids along the channel allowed by the thread clearances. The finely divided copper flake likewise serves to form such a dam, but its primary function appears to be that of forming a protective medium for the thread surfaces, the copper being forced into irregularities of the thread surfaces when torque and rubbing pressure are applied, thereby producing a surface substantially less subject to pressure-welding and galling. Thus the carrier or viscous lubricating constituent may be destroyed by heat, or other means, without impairing the damming produced in the thread tolerance channels or substantially increasing the hazard of galling the thread surface.

I have employed several of my thread sealing and lubricating compounds to the joints of a pipe string similar to that encountered in actual operations and compared leakage and torque make-up and break-out results with a conventional zinc base lubricant. The pipe string was composed of nine freshly cut joints fastened with new couplings. The torque make-up or break-out of the joint was determined in foot-pounds by the use of a machine employed for such purpose operating at a rotational speed of ½ to 3 R. P. M. and capable of applying 7000 horsepower. The leakage characteristics of each compound were determined by a water-pressure testing of the casing, commencing at 1000 p. s. i. and increasing in increments of 1000 p. s. i. to a final pressure of 6000 p. s. i. The pressure was held on the joints for two minutes at each increment and finally, at 6000 p. s. i., for five minutes. The pipe string used as a basis for these comparisons was a seven-inch casing (26 pound-8 thread round-N80) section.

*Example I*

To the nine joints was applied a conventional zinc base lubricant comprising essentially by weight 50% of powdered zinc and 50% of an aluminum base grease. This base or carrier was composed of aluminum stearate and a viscous mineral oil of about a 300 to 325 second Saybolt Universal standard viscosity at 100° F. The pressure test on the casing revealed that six of the nine joints leaked at pressures below 6000 p. s. i. within the five-minute test period. The break-out torques required ranged from 1,445 to 21,300 foot pounds and upon examination of the threaded joints, the lubricant was found to be in generally poor condition. Distribution and retention of the compound on the threaded surfaces was unsatisfactory and one joint was completely bare with the exception of very solidly packed, fused zinc in the thread roots. In addition, threads of three joints were badly galled and severe chafing was apparent on the thread surfaces of all the joints.

*Example II*

Three of the six joints found to leak in Example I were covered with a sealing and lubricating compound containing 15% by weight, and in equal proportions, of flake copper, lead and graphite, with a vehicle essentially as described in Example I. The couplings were made up to 7,220 foot pounds and pressure tested to 6000 p. s. i. in which no leaks developed during the two-minute period. The break-out torque on these joints averaged 10,830 foot pounds. The thread protection afforded by this lubricant was excellent and the galls and chafing did not increase in any instance.

*Example III*

To the remaining three joints found to leak in Example I was applied a thread sealing and lubricating composition containing by weight 30%, in equal proportions, of the solid components flake copper, lead and graphite, and a vehicle substantially as indicated in Example I. The couplings were made up to 7,220 foot pounds and pressure tested to 6000 p. s. i. in which no leaks developed during the two-minute test period. Break-out torques on the joints averaged only 8,783 foot pounds and, upon examination, the lubricant was found to be in good condition and exhibited a smooth, even coating of thread surfaces. The galls and chafing had not increased in any instance, and there was packing and some healing of the chafing and scars on these surfaces to which this composition was applied.

In addition, I have compared the make-up torque, break-out torque and leakage characteristics of a sealing lubricant containing about 22% of each metallic component, as hereinbefore described, with a conventional zinc base compound. The three types of tubular stock used were a 7-inch casing (26 lb., 8 thread round), a 2½-inch external upset tubing (6.50 lb., 8 thread round) and a 2-inch external upset tubing (4.70 lb., 8 thread round). The high temperature test was conducted by the application to the stock of 30-minute elevated temperatures of 406° F., 410° F. and 385° F., respectively, while the pressures were varied up to 6000 pounds per square inch in the casings and 3500 pounds per square inch in the tubings.

*Example IV*

| Tubular stock | Increase in Breakout Torque over make-up Torque, per cent | | | |
|---|---|---|---|---|
| | Conventional zinc base lubricant | | New sealing lubricant | |
| | Unheated | Heated | Unheated | Heated |
| | Per cent | Per cent | Per cent | Per cent |
| 7-inch casing | +43 | +105 | +25 | +30 |
| 2½-inch tubing | +69 | +384 | +26 | +109 |
| 2-inch tubing | +18 | +179 | −20 | +65 |

| Tubular stock | Thread leaks developed, per cent of total joints leaking | | | |
|---|---|---|---|---|
| | Conventional zinc base lubricant | | New sealing lubricant | |
| | Unheated | Heated | Unheated | Heated |
| | Per cent | Per cent | Per cent | Per cent |
| 7-inch casing | 28 | 66 | 0 | 0 |
| 2½-inch tubing | 0 | 100 | 0 | 0 |
| 2-inch tubing | 0 | 0 | 0 | 0 |

My method of sealing and lubricating threaded joints and the compound effective to this end may be used with satisfactory results on the threaded members of high pressure-high temperature steam pipes as used in refineries or boiler gaskets, bolts and studs, engines in the automotive industry, aircraft engines, water and acid pipes and on tubes and piping that are bent in different shapes and sizes. In particular, it is very effective in preventing the leakage of fluids through the threaded joints in the casing and tubing strings used in the production of petroleum oils and gases, thereby avoiding the loss of casing pressure, the infiltration of water and escape of product. Deeper drilling practices characteristic of present day petroleum production has accentuated the need for such a sealing lubricant as I have described because of heavier string loads and higher formation temperature and pressures encountered at such lower subterranean levels.

It will be understood that the reference herein, and in the appended claims, to the rust preventive lead soap is intended to include compounds of lead and animal or vegetable fats, fatty acids, or fatty acid derivatives, as well as certain petroleum derivatives, particularly oxidized petroleum, and that reference to other metallic soaps is intended to include compounds of metals other than lead, notably sodium or calcium, and animal or vegetable fats, or fatty acids.

I claim:

1. A thread sealing and lubricating compound comprising essentially finely-divided copper in flake form of particle size within the range of from one micron to about 76 microns, powdered lead, amorphous graphite and a petroleum vehicle, the petroleum vehicle comprising from about 30% to about 85% of the compound and forming a medium in which the finely-divided copper, the powdered lead and the amorphous graphite are suspended, the lead being present in amount from about one-third part to three parts by weight to each part by weight of the graphite, and the proportion of the finely-divided copper to the combined amount of the copper, lead and graphite being in the range of from 5 to 100%.

2. A thread sealing and lubricating compound compounded from the following ingredients in proportion by weight, substantially as indicated:

| | Per cent |
|---|---|
| Flake copper | 10.0 |
| Amorphous graphite | 10.0 |
| Powdered lead | 10.0 |
| Viscous petroleum vehicle | 65.51 |
| Aluminum stearate soap | 4.46 |
| Thio-dilauric acid | 0.03 | the particle size of the flake copper being in the range of from one micron to about 76 microns.

3. A thread sealing and lubricating compound compounded from the following ingredients in proportion by weight, substantially as indicated:

| | Per cent |
|---|---|
| Flake copper | 22.0 |
| Amorphous graphite | 22.0 |
| Powdered lead | 22.0 |
| Viscous petroleum vehicle | 31.5 |
| Rust preventive lead soap | 1.5 |
| Other metallic soap | 1.0 | the flake copper being of a particle size within the range of from one micron to about 76 microns, and the other metallic soap being a metallic soap from the class consisting of sodium soaps and calcium soaps.

HENRY C. ZWEIFEL.

(References on following page)

REFERENCES CITED

The following references are of record in the file of this patent:

UNITED STATES PATENTS

| Number | Name | Date |
|---|---|---|
| 1,758,598 | Frizell | May 13, 1930 |
| 2,065,248 | Smith | Dec. 22, 1936 |
| 2,183,347 | Campbell | Dec. 12, 1939 |
| 2,205,990 | Nelson et al. | June 25, 1940 |

FOREIGN PATENTS

| Number | Country | Date |
|---|---|---|
| 206,706 | Great Britain | Nov. 15, 1923 |